Figure 1:
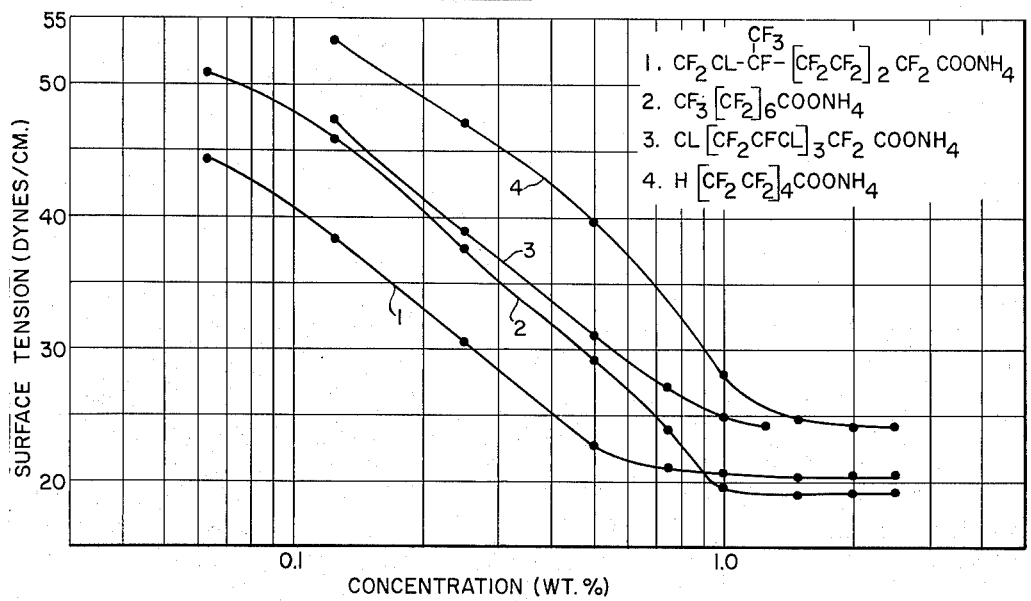

United States Patent Office 3,232,970
Patented Feb. 1, 1966

3,232,970
TERMINALLY BRANCHED AND TERMINALLY MONOCHLORINATED PERFLUOROCARBOXYLIC ACIDS
Murray Hauptschein, Glenside, and Milton Braid, Philadelphia, Pa., assignors to Pennsalt Chemicals Corporation, Philadelphia, Pa., a corporation of Pennsylvania
Filed June 2, 1961, Ser. No. 124,257
3 Claims. (Cl. 260—408)

This invention relates to new terminally branched and terminally monochlorinated perfluorocarboxylic acids and derivatives thereof.

This application is a continuation-in-part of copending applications Serial No. 735,702, filed May 16, 1958, now abandoned of Murray Hauptschein et al. and of Serial No. 790,080, filed January 30, 1959, of Murray Haptschein et al., now U.S. Patent 3,002,031, issued September 20, 1961.

Perfluorinated carboxylic acids containing a relatively long fluorocarbon chain are a relatively new class of compounds which are highly prized for their unique properties. See for example, U.S. Patent 2,567,011 to Diesslan et al. describing acids of this type. The unique properties and valuable uses of these acids and their derivatives derives primarily from the interness and extremely low surface energy of the perfluorocarbon portion of the molecule. Because of this extremely low surface energy, such compounds have been found capable of producing dramatic modifications in the surface properties of both liquids and solids. Thus, relatively small concentrations of such fluorocarbon acids or their derivatives in water will lower the surface tension to a value which is a fraction of its normal value. When a layer of the fluorocarbon acid or a derivative is adsorbed or chemically bonded on a solid surface, the exposed fluorocarbon "tails" provide a surface of such low energy that it becomes both water and oil repellant. Such properties have led to valuable applications of these materials as agents for modifying the surface properties of fabrics and the like to improve their repellancy and therefore stain resistance to a great variety of liquids.

In the past, the surface modifying properties of the fluorocarbon acids and their derivatives have been found to be extremely sensitive to the replacement of one or more fluorine atoms in the fluorocarbon chain with other elements such as hydrogen, chlorine, bromine or the like, particularly when the substitution occurs at the terminal portion of the chain. Thus, the single terminal hydrogen atom of the omega hydro perfluorocarboxylic acids, $H(CF_2)_nCOOH$ has a drastic effect on these properties, such that they are rendered completely unsuitable for many applications in which their fully fluorinated analogs are highly prized. Similarly, the chlorofluorocarboxylic acids such as those of the formula $$Cl(CF_2CFCl)_nCF_2COOH$$

although completely halogenated and containing a high proportion of fluorine do not display the extremely low surface energy characteristics of the fully fluorinated analogous compounds. Based on these observations, it has been considered that only the fully fluorinated materials are capable of providing extreme surface properties and that the presence of other substituents, particularly in the terminal portion of the fluorocarbon chain, would greatly reduce the capability of the fluorinated material in this respect.

It has now been found, contrary to expectation, that certain terminally branched chain, terminally monochlorinated perfluorocarboxylic acids and derivatives thereof display surface properties which are substantially equivalent to, or even under some conditions superior to, those displayed by completely fluorinated acids and their derivatives of equivalent chain length. As will be set forth in the more detailed description which follows, the unexpectedly superior properties of the monochlorinated perfluoro compounds of the invention can be readily observed by direct comparison with corresponding perfluorinated compounds, with monohydroperfluorinated compounds and with chlorinated compounds of the same type.

The new acids of the invention are monochlorinated perfluoro acids having a chain length of at least six carbon atoms and having the general formula:

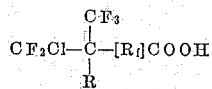

where $R_f$ is an open chain perfluoroalkylene radical containing from 3 to 9 carbon atoms and where R may be fluorine or a $CF_3$-radical. Preferred acids are those of the formula:

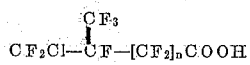

where $n$ is an integer of from 3 to 9 inclusive.

The acids of the invention accordingly are terminally branched chain, terminally monochlorinated but otherwise completely fluorinated carboxylic acids having a chain length of at least six carbon atoms and preferably 7 to 11 carbon atoms. A minimum chain length of at least six carbon atoms is required to obtain the desired high degree of surface modifying activity. Shorter chain length compounds are markedly less efficient in this respect, probably due to the necessity for separating the end of the fluorocarbon "tail" a sufficient distance from the functional group at other end of the molecule. It is probable that the effect of hydration and analogous phenomena that occur at the functional group extends back along the fluorocarbon chain an appreciable distance. In short chain compounds the sphere of hydration or similar effect at the function group may block off substantially the entire fluorocarbon portion of the molecule and thus isolate the fluorocarbon portion from the contact with the surrounding environment. In such circumstances the fluorocarbon portion is unable to exert any appreciable surface modifying effect. The members having in excess of about 14 carbon atoms are not preferred since they are considerably less useful for many applications such as where some limited degree of solubility is required such as in surfactant applications in aqueous media. Also the higher members are more expensive to prepare without a corresponding benefit in the form of increased surface properties since no significant improvements are obtained in surface modifying properties when the fluorocarbon portion of the compound is increased beyond about $C_{14}$.

While the invention does not depend upon any particular theory it is believed that the unexpectedly superior surface properties of the compounds of the invention is due at least in part to the branched chain configuration at the end of the molecule where the terminal monochlorodifluoromethyl group is accompanied by one (or two) terminal perfluoromethyl groups. It is believed that this configuration tends to minimize the effect of the chlorine atom on the surface properties by presenting groups containing a total of at least five fluorine atoms with the single chlorine atom at the end of the molecule. According to generally accepted theory, it is believed that the extreme surface effects produced by perfluorinated materials is due to the lining up, or orientation of, the fluorocarbon "tails" on the treated surface so as to present an interface composed largely of these close packed perfluorocarbon "tails." Thus, an extremely low energy surface is created at the interface promoting extremely low interfacial tensions which are responsible for the amazing hydrophobic and oleophobic properties obtainable by so treating the surface. Ordinarily, the presence of an extraneous element such as hydrogen or chlorine at the terminal portion of the fluorocarbon tail will have a pronounced deleterious effect upon the surface properties located as it is in the most exposed portion of the fluorocarbon chain. In the case of the compounds of the invention, however, the terminally branched configuration with one or two terminal perfluoromethyl groups appears to compensate for the terminal chlorine. Irrespective of the validity of this explanation however, it has been shown by direct comparison with perfluorinated compounds of corresponding chain length that despite the terminal chlorine atom in applicants' compounds, they have outstanding surface activity of the same order as the perfluorinated compounds.

One of the salient advantages of the monochloroperfluoro compounds of the invention is the fact that they may be readily prepared on a large scale by relatively simple telomerization procedures to produce telomers from which excellent yields of the acids or their derivatives may be directly obtained. The perfluorinated acids, in contrast are currently produced commercially by electrochemical fluorination of corresponding hydrogenated compounds in liquid hydrogen fluoride. See for example, U.S. Patent 2,519,983 of Simons describing such electrochemical procedures. Such methods of preparation are relatively expensive. Yields are low particularly when fluorinating relatively long chain compounds containing six or more carbon atoms. In such cases yields are greatly reduced by the degradation of the carbon chain and formation of by-products under the required reaction conditions.

According to the preferred method for preparing the compounds of the invention, a tetrafluoroethylene telomer iodide is prepared by reacting an iodide of the formula

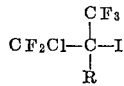

where R is F or $CF_3$— with tetrafluoroethylene under super-atmospheric pressures and at temperatures of from 150° to 220° C. and preferably from 150° C. to 190° C. Telomer iodides of the formula

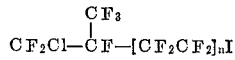

or

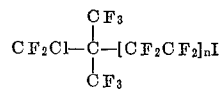

are produced (depending on whether the telogen iodide

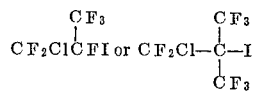

is used) which serve as precursors for the production of the corresponding acids and their derivatives. The telogen iodides may be prepared by addition of ICl to perfluoropropene or perfluoroisobutylene. The telomerization reaction may be readily controlled to produce high yields of telomers in which the value of $n$ is in the range of 2 to about 5, i.e. telomers containing from 7 to about 14 carbon atoms.

After separating individual telomers or mixtures of telomers of desired chain length, the iodides are converted to chlorosulfates or fluorosulfates by reaction with chlorosulfonic or fluosulfonic acid by the procedures illustrated by the examples which follow.

The chlorosulfates of the formula

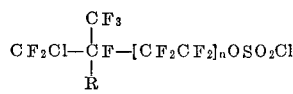

(or the corresponding fluorosulfate) may then be readily converted by basic hydrolysis into the acid or an alkali metal salt of the acid as exemplified by the following reaction:

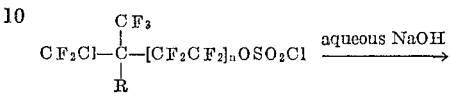

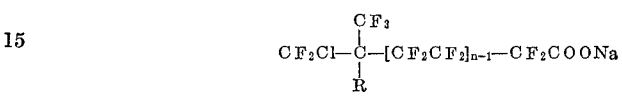

The free acid may be obtained by acidification, e.g. with sulfuric acid.

The acids themselves may be converted into various derivatives such as salts, acyl halides, esters, nitriles, amides, N-substituted amides, thiolesters and the like by means which in themselves are well known. Thus, the alkali metal salts such as sodium, potassium, lithium etc., the alkaline earth salts, such as calcium, magnesium, etc., and other metal salts, both simple and complex, such as copper, iron, aluminum, chromium, and titanium salts, can be produced by directly reacting the acid with corresponding hydroxide, oxide, or carbonate of the metal. The ammonium salts may be readily prepared by bubbling gaseous ammonia through a solution of the acid in a solvent, such as ether or a fluorochlorinated solvent, e.g. $CF_2ClCFCl_2$, causing precipitation of the insoluble ammonium salt which may be readily recovered filtering off the salt or by removal of the solvent by evaporation to dryness.

Salts of special types for special applications may be prepared according to reactions which are known in themselves. For example, the chromium Werner type complexes of the acids of the invention may be prepared in accordance with the methods described in U.S. Patent 2,693,458 of Olson.

The acyl halides may be obtained by reaction of the acid with anhydrous phosphorus halides. For example, the acid chlorides may be prepared by reaction with phosphorus trichloride or pentachloride and the acid bromides by treatment with phosphorus tribromide. The esters of the acids of the invention may be prepared by reacting the acid itself or the acyl chloride or fluoride with the corresponding alcohol e.g. methanol, ethanol, propanol, butanol or other alkanols, or with substituted alkanol, such as benzyl alcohol, or polyhydroxy alcohol such as ethylene glycol. Esterification proceeds readily at reflux temperatures with or without a mineral acid as a catalyst.

The amides and the N-substituted amides of the acids of the invention may be prepared by reacting the acyl chloride with ammonia or the corresponding primary or secondary amine. Thus, by bubbling anhydrous ammonia through a solution of the acid chloride at a temperature e.g. of 0° to 50° C., the corresponding amide may be obtained. The nitriles of the acids of the invention may be obtained from the amides by dehydration of the amide with phosphorus pentoxide. The reaction may be effected by addition of the $P_2O_5$ directly to the corresponding amide.

Instead of preparing the derivatives of the acids directly from the acid or from an acyl halide as described above, an alternative, and often preferable procedure is to prepare the derivative directly from the corresponding chlorosulfate or fluorosulfate which in turn is prepared by the reaction of the corresponding iodide with chlorosulfonic or fluosulfonic acid. Thus, as will be illustrated in examples which follow, esters may be prepared directly from the chlorosulfate or fluorosulfate by adding either of these to an excess of the appropriate alcohol. Cooling during the addition may be desirable although temperatures up to the boiling point of the refluxing mixture may be beneficial in some cases.

The amides may be directly prepared from the chlorosulfate or fluorosulfate by ammonolysis preferably carried out by passing an excess of anhydrous ammonia, often with cooling, into the halosulfate, or a solution thereof, in an inert anhydrous solvent such as ethyl ether or trichlorotrifluoroethane. After removal of inorganic ammonium salts, the amide may be isolated directly after removal of the solvent by distillation or evaporation and/or by crystallization.

The N-substituted amides may be prepared directly from the corresponding chlorosulfate or fluorosulfate by cautiously adding the halosulfate to an excess of the amine, or a solution thereof, in an inert anhydrous solvent. After removal of the inorganic amine salts by filtration or water wash, the amide may be isolated directly, or after removal of the solvent by distillation or evaporation and/or by crystallization. Either primary amines, e.g. methylamine, ethylamine, ethanolamine, propanolamine, etc. or secondary amines, e.g. dimethylamine, diethylamine, diethanolamine etc. or polyamines such as ethylene diamine will react to form the corresponding substituted amides.

The thiol esters of the acids of the invention may be produced directly from the corresponding chlorosulfate or fluorosulfate by adding the halosulfate to an excess of the appropriate thiol. The reaction may be carried out at a temperature varying from room temperature to the boiling point of the refluxing mixture. The reaction mixture is poured into ice water and the organic part separated after which the crude thiol ester may be dried, distilled and purified by washing or crystallization from a solvent or the like.

The precursor iodides (for conversion to the acid or derivatives via the halosulfate route) may also be prepared by cotelomerizing tetrafluoroethylene with another perfluoroolefin such as perfluoropropene, perfluorobutene-1, perfluoropentene-1 or the like using the telogen iodides described above. Cotelomerization reactions of this type are described and claimed in copending application Serial No. 790,080, filed January 30, 1959 of Murray Hauptschein et al, now U.S. Patent 3,002,031, issued September 20, 1961. The telomers resulting such cotelomerization reactions will be those of the general formula:

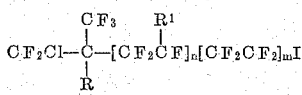

where $R^1$ is a perfluoroalkyl radical having from 1 to 3 carbon atoms, where R is fluorine of $CF_3$; where $n$ is an integer of from 1 to 3; and where $m$ is an integer of from 1 to 4; the value of $n$ plus $m$ being such that the total number of carbon atoms in the telomer is not in excess of from about 8 to 14. When such telomerizations are carried out, it has been found that the telomer molecule preferentially terminates in a $-CF_2CF_2I$ end group, although the units from tetrafluoroethylene and the other olefin may alternate with one another within the chain in random order both singly and in small groups. In these cotelomers it will be noted that branching occurs not only in the terminal portion of the molecule but also in the $R_f$ portion.

Still another procedure for preparing the telomer iodide precursors is first to prepare a short chain telomer iodide of the formula:

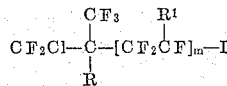

where $R^1$ is a prefluoroalkyl radical having from 1 to 3 carbon atoms where R is fluorine or $-CF_3$ and where $m$ is 1 or 2 by reacting a telogen iodide of the type described with a perfluoroolefin having three or more carbon atoms such as perfluoropropene, perfluorobutene or the like in accordance with the procedures described in copending application Serial No. 701,995, filed December 11, 1957, now Patent No. 3,083,238, of Murray Hauptschein et al. This telomer is then reacted with one or more moles of tetrafluoroethylene using the procedures illustrated in Example 1 to produce telomer iodides of the formula:

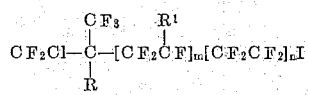

where $m$ is the integer 1 or 2 and where $n$ is an integer of from 1 to 4 inclusive, the sum of $n$ plus $m$ being such that the total number of carbon atoms in the telomer is not in excess of about 14. Where perfluoropropene is the other olefin, the telomers have the formula:

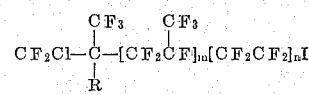

In this type of "block" cotelomers, the tetrafluoroethylene units are grouped separately at the end of the molecule. Here again the $R_f$ portion of the corresponding acids contains branching in the chain.

As an alternative route of conversion of the telomer iodides

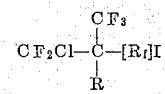

to the acids these may be reacted with acetylene at a temperature of aproximately 200° C. to provide the addition product

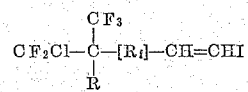

This in turn may be converted to the acid by reaction with alkaline aqueous permanganate solution. By oxidation at the double bond, the acid

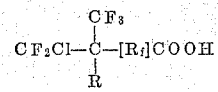

is obtained.

The following examples are intended to illustrate the invention:

*Example 1.—Preparation of telomer iodides*

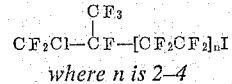

*where n is 2–4*

The telogen iodide

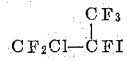

is prepared by the addition of iodine monochloride to perfluoropropene $CF_3CF=CF_2$. Into a one liter Monel autoclave containing 826 g. of iodine monochloride, 629 g. of perfluoropropene is transferred in vacuo. The autoclave is sealed and allowed to shake overnight at 98° C. The liquid product is washed with sodium thiosulfate solution, dried over anhydrous calcium sulfate and distilled. The addition product

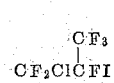

boiling at 78 to 78.5 C. refractive index $n_D^{25}$ 1.375 is obtained in good yield.

Telomer iodides of the above formula are prepared as follows:

A 300 millimeter Monel autoclave is charged under a dry nitrogen atmosphere with 221 grams (0.709 mole) of $$CF_2Cl\overset{\displaystyle CF_3}{\underset{\displaystyle |}{C}}FI$$

The reactor is then cooled and evacuated after which 88 grams of tetrafluoroethylene is admitted to the autoclave by gaseous transfer in vacuo. The autoclave is sealed and heated while shaking for five hours at 165° to 170° C. during which time the pressure drops from 1100 to 300 lbs./in.² (about 90% of the pressure drop occurring in the first 1½ hours). The autoclave is then allowed to cool and the telomer iodide product consisting of about 175 grams of telomer iodides of the formula $$CF_2Cl\overset{\displaystyle CF_3}{\underset{\displaystyle |}{C}}F[CF_2CF_2]_nI$$

where the value of $n$ ranges from 1 to about 7 is distilled to separate the following individual telomers:

(a) 
$$CF_2Cl\overset{\displaystyle CF_3}{\underset{\displaystyle |}{C}}F[CF_2CF_2]_2I$$

(24% by weight of total telomers) having a boiling point of 78° C. at 36 mm. Hg, a refractive index $n_D^{28}$ 1.3552.

*Analysis.*—Calculated for $C_7ClF_{14}I$: C, 16.41; Cl, 6.92; I, 24.77. Found: C, 16.60; Cl, 6.95; I, 25.21.

(b) 
$$CF_2Cl\overset{\displaystyle CF_3}{\underset{\displaystyle |}{C}}F[CF_2CF_2]_3I$$

(35% by weight of total telomers) having a boiling point of 106° C. at 34 mm. Hg and a refractive index $n_D^{28}$ 1.3492.

*Analysis.*—Calculated for $C_9ClF_{18}I$: C, 17.65; Cl, 5.79; I, 20.72. Found: C, 17.71; Cl, 5.74; I, 21.05.

(c) 
$$CF_2Cl\overset{\displaystyle CF_3}{\underset{\displaystyle |}{C}}F[CF_2CF_2]_4I$$

(12% by weight of total telomers) having a boiling point of about 130° C. at 30 mm. Hg.

*Analysis.*—Calculated for $C_{11}ClF_{22}I$: C, 18.54; I, 17.81. Found: C, 18.64; I, 18.06.

*Example 2.—Preparation of*

$$CF_2Cl\overset{\displaystyle CF_3}{\underset{\displaystyle |}{C}}F[CF_2CF_2]_2CF_2COOH$$

Thirty-six grams (0.059 mole) of the iodide $$CF_2Cl\overset{\displaystyle CF_3}{\underset{\displaystyle |}{C}}F-[CF_2CF_2]_3I$$

was placed in a three-necked flask equipped with a thermocouple well, stirrer, water-cooled condenser followed by a Dry Ice-cooled trap, and an addition funnel. While maintained under a high purity nitrogen atmosphere, 35 grams (0.30 mole) of chlorosulfonic acid is added drop by drop to the iodide while stirring over a period of one and one-half hours while maintaining a reaction temperature of 130 to 142° C. Iodine and iodine chlorides are formed and sulfur dioxide is collected in the cold trap. The reaction mixture is stirred for an additional three hours at 142–152° C. After cooling, the contents of the flask are poured onto crushed ice and the lower layer, consisting of the crude chlorosulfate $$CF_2Cl-\overset{\displaystyle CF_3}{\underset{\displaystyle |}{C}}F-[CF_2CF_2]_3OSO_2Cl$$

is separated. The latter is then hydrolyzed by adding to the chlorosulfate a 25% sodium hydroxide aqueous solution in small amounts until the pink color produced by the liberation of iodine vanishes permanently. Thereafter the solution is heated to reflux temperature for one hour with stirring. This produces a solution of the sodium salt of the acid $$CF_2Cl-\overset{\displaystyle CF_3}{\underset{\displaystyle |}{C}}F-[CF_2CF_2]_2CF_2COONa$$

After filtering, the solution was acidified with concentrated sulfuric acid. The insoluble fluorocarbon acid separates and there is obtained a 70% conversion of crude $$CF_2Cl-\overset{\displaystyle CF_3}{\underset{\displaystyle |}{C}}F-CF_2CF_2CF_2CF_2COOH$$

The acid is purified by distillation at reduced pressure and is found to boil at 124° C. at 17 mm. Hg. It has a refractive index $n_D^{27}$ 1.3307; it shows an infrared absorption band at 5.65μ indicating the carbonyl stretching vibration and at 3.0–3.2μ indicating the —OH stretching vibration.

*Analysis.*—Calculated for $C_9F_{16}ClO_2H$: C, 22.49; Cl, 7.37; F, 63.26; molecular weight, 480.5. Found: C, 22.65; Cl, 7.08; F, 61.89; molecular weight (neutralization equivalent), 471.

*Example 3.—Preparation of the ammonium salt of*

$$CF_2Cl-\overset{\displaystyle CF_3}{\underset{\displaystyle |}{C}}F-[CF_2CF_2]_2CF_2COOH$$

The above acid is dissolved in a large excess of $CF_2ClCFCl_2$. Gaseous ammonia is bubbled through the solution at room temperature until precipitation is complete. The $CF_2ClCFCl_2$ solvent is removed by evaporation under vacuum to provide the ammonium salt $$CF_2Cl-\overset{\displaystyle CF_3}{\underset{\displaystyle |}{C}}F-[CF_2CF_2]_2CF_2COONH_4$$

a white crystalline solid.

*Example 4.—Surface properties of*

$$CF_2Cl-\overset{\displaystyle CF_3}{\underset{\displaystyle |}{C}}F-[CF_2CF_2]_2CF_2COONH_4$$

One indication of the surface energy properties of a material soluble to at least some extent in water is the degree to which it lowers the surface tension of the water. In the case of materials such as those of the present invention, which have a hydrophobic fluorocarbon group at one end of the molecule and a hydrophyllic group at the other end, the degree to which the surface tension of the water is lowered is an indication of the surface energy properties of the fluorocarbon portion. The lower the surface tension the lower the indicated surface energy.

In order to provide a direct comparison in respect of surface energy properties between the compounds of the invention and similar compounds of equivalent chain length of the prior art, the ammonium salts of the following acids are prepared: (a) the perfluorinated acid $CF_3(CF_2)_6COOH$; (b) the omega hydro perfluorinated acid $H[CF_2CF_2]_4COOH$ and (c) the chlorofluoro acid $Cl[CF_2CFCl]_3CF_2COOH$. The ammonium salts of these acids are prepared in the same manner as described in Example 3, i.e. anhydrous ammonia is bubbled through a solution of the acid in $CF_2ClCFCl_2$ and the crystalline ammonium salt recovered by evaporation of the solvent.

The surface tension of water solutions of the ammonium salt of Example 3 and the three ammonium salts referred to above are determined as follows:

Thoroughly deionized distilled water is employed having a surface tension before any additive of 68.0 dynes/cm. at 80° F. Solutions of the various compounds in such water are prepared in concentrations ranging from 0.0625% to 2.5% by weight. The surface tensions of the resulting solutions are measured using a model 70540 Cenco du Nuoy Interfacial Tensiometer using a ring of 5.997 centimeters circumference. All measurements are made with the solution contained in an 8.5 centimeter diameter evaporating dish. The temperature in all cases is approximately 26.7° C. (80° F.) Corrections are applied to the data by the method of Harkins as given in Weissburger's "Technique of Organic Chemistry," page 392, using the formula:

$$\gamma = \frac{Mg}{4\pi R} \cdot F$$

where M is the mass of the liquid; R is the radius of the ring; g is the gravitational constant; F is a correction factor and $\gamma$ is the surface tension in dynes/cm.

The surface tension data obtained is summarized in FIGURE 1 of the drawings where the concentration of the ammonium salt is plotted on the horizontal axis on a log scale while the surface tension in dynes/cm. is plotted on the vertical axis on a linear scale. Curves 1 to 4 represent respectively the ammonium salt of Example 3, the perfluorinated ammonium salt $CF_3(CF_2)_6COONH_4$, the fluorochloroammonium salt $$Cl[CF_2CFCl]_3CF_2COONH_4$$

and the omega hydroperfluoroammonium salt $$H(CF_2CF_2)_4COONH_4$$

As may be seen by comparison of these curves, the compound of Example 3 (curve 1) produces lower surface tension at all concentrations except for the case of the perfluorinated ammonium salt (curve 2) which exhibits slightly lower surface tensions at concentrations over about 1%. In contrast, it will be noted that the chlorofluoro acid ammonium salt (curve 3) and the omega hydroperfluoroammonium salt (curve 4) exhibit higher surface tensions that the perfluoroinated salt of curve 2 at all levels of concentration. The remarkably low surface tensions exhibited by the terminally chlorinated compound of the invention is entirely unexpected, particularly its superiority to the perfluorinated compound at concentrations of less than about 1%.

*Example 5.—Preparation of*

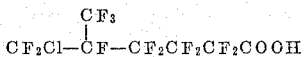

Into a three-necked flask equipped with a thermocouple well, stirrer, water-cooled condenser followed by a Dry-Ice-cooled trap, and an addition funnel, there is introduced 36 grams (0.0703 mole) of the iodide

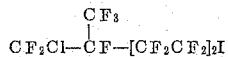

prepared as in Example 1. While maintaining the reaction under a high purity nitrogen atmosphere, 42 grams (0.361 mole) of chlorosulfonic acid is added drop by drop while stirring over a period of one-half hour at a reaction temperature of 130° to 138° C. Iodine and iodine chlorides are formed and sulfur dioxide is collected in the cooled trap. The reaction mixture is stirred for an additional 5 hours at 132 to 135° C. After cooling, the contents of the flask are poured onto crushed ice and the lower layer, consisting of crude

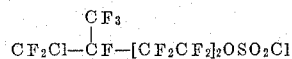

is separated. The chlorosulfate is hydrolyzed by adding drop by drop a 25% aqueous solution of sodium hydroxide until the pink color due to liberated iodine permanently vanishes. The mixture is then heated at reflux for one hour after which it is cooled and filtered using a coarse fritted glass Buchner funnel to remove 3.5 grams of white inorganic salts. The clear filtrate is then made strongly acid by slow addition with cooling of concentrated sulfuric acid. The insoluble fluorocarbon acid separates as the lower layer yielding 24 grams (90% yield) of the acid

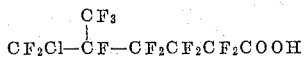

Upon purification of the acid by distillation at reduced pressure it is found to boil at 119° C. at 40 mm. Hg; to have a refractive index $n_D^{29}$ 1.3330; an infrared absorption band at 5.64μ for the carbonyl stretching vibration and at 3.0 to 3.2μ for the —OH stretching vibration.

*Analysis.*—Calculated for $C_7F_{12}ClO_2H$: C, 22.09; Cl 9.34; F, 59.92; molecular weight, 380.5. Found: C, 22.03; Cl, 8.97; F, 59.12; molecular weight (neutralization equivalent), 373.

*Example 6.—Preparation of*

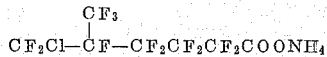

The ammonium salt of the acid of Example 5 is prepared in the manner described in Example 3 by bubbling anhydrous $NH_3$ through a solution of the acid in $CF_2ClCFCl_2$. The white crystalline ammonium salt is recovered upon evaporation of the solvent.

*Example 7.—Surface properties of*

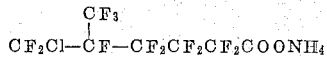

In order to provide a basis for comparison between the compound of Example 6 and ammonium salts of similar fluorinated and chlorofluorinated acids of the same chain length, the ammonium salts of the following acids are compared in the manner previously described: (a) the perfluorinated acid $CF_3[CF_2]_4COOH$; (b) the chlorofluoroacid $Cl[CF_2CFCl]_2CF_2COOH$ and (c) the omega hydroperfluoro acid $H[CF_2CF_2]_3COOH$.

Figure 2:
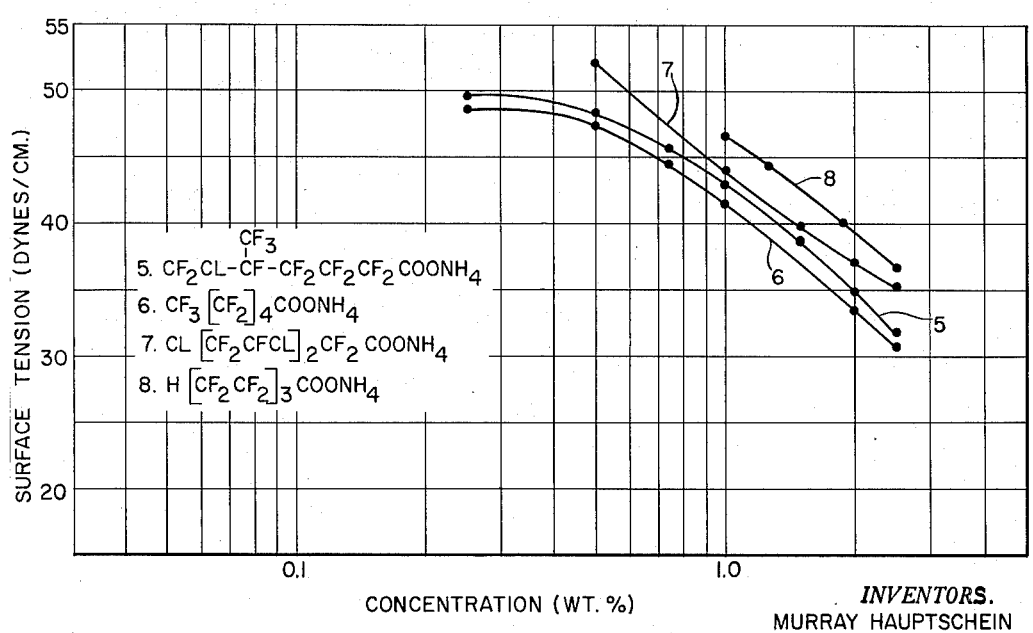

The surface tension of water solutions of the ammonium salt of Example 6 and of the ammonium salts of the three acids listed above are measured in concentrations of from 0.25% to 2.5% in the same manner as described in connection with Example 4. The data is shown graphically in FIGURE 2 plotted in the same manner as in FIGURE 1. In FIGURE 2 curves 5 to 8 represent respectively the surface tensions obtained by the ammonium salt of Example 6, the ammonium salt of the perfluoro acid $CF_3[CF_2]_4COONH_4$, the ammonium salt of the chlorofluoro acid $Cl[CF_2CFCl]_2CF_2COONH_4$, and the ammonium salt of the omega hydro acid $$H[CF_2CF_2]_3COONH_4$$

As may be seen from this set of curves, the compound of Example 5 (curve 5) is only slightly less effective in reducing the surface tension of water at all concentrations studied than the salt of the perfluorinated acid of equivalent chain length (curve 6). In contrast, the chlorofluoroacid (curve 7) and the omega hydroperfluoro acid (curve 8) are less effective in reducing the surface tension of water at all concentrations studied. Here again the data indicates the excellent surface activity of the compounds of the invention despite the terminal chlorine atom.

*Example 8.—Preparation of*

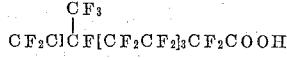

A mixture of 13.5 grams (0.019 mole) of

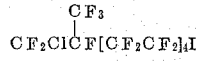

and 11.4 grams (0.098 mole) of $HSO_3Cl$ is heated at 135 to 140° C. After about three-quarters of an hour a vigorous reaction ensues with the evolution of $I_2$, $ICl$, and $ICl_3$. After 6 hours the reaction mixture is cooled and poured over ice whereupon a soft solid precipitate is obtained, this being the chlorosulfate

The chlorosulfate is separated and stirred with 50 milliliters of 10% sodium hydroxide for three hours at room temperature and then for 7 hours at 60° to 65° C. The carboxylic acid sodium salt, viz.

is obtained.

To obtain the free carboxylic acid, 50 milliliters of sulfuric acid is added slowly to the mixture containing the sodium salt while cooling. A dense gelatinous solid is obtained which is taken up in a mixture of benzene and $$CF_2ClCFCl_2$$

After distilling off the $CF_2ClCCl_2F$ and the benzene, the residue is distilled at reduced pressure. After a forerun is collected at 64° to 65° C. at 5 mm. Hg, the free acid

is obtained as a colorless oil having a boiling point 110° to 115° C. at 5 mm. Hg which slowly solidifies at room temperature.

*Analysis.*—Calculated for $C_{11}ClF_{14}HO_2$: Cl, 6.10. Found: Cl, 6.12; neutralization equivalent: calculated, 580.6; found, 560.

*Example 9.*—Preparation of the ethyl ester of

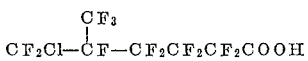

An excess of absolute ethanol is added to the chlorosulfate

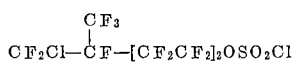

prepared as in Example 5. The reaction mixture is stirred for about one hour after which it is heated at reflux for an additional hour. The reaction mixture is poured into ice water and the resulting lower layer is dried with anhydrous calcium sulfate. There is obtained a colorless liquid boiling at 95–97° C. at 40 mm. Hg, with a refractive index $n_D^{25}$ 1.3355.

*Analysis.*—Calculated for $C_8H_5ClF_{12}O_2$: C, 26.50; H, 1.23; Cl, 8.70. Found: C, 26.81; H, 1.65; Cl, 8.9.

*Example 10.*—Prepartion of

Anhydrous ammonia is passed for 10 minutes through a solution of the chlorosulfate

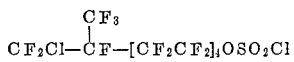

prepared in accordance with Example 8 while dissolved in excess of anhydrous ether at room temperature. After filtration of the ammonium salts the filtrate is heated in a water bath to remove most of the ether. Heptane is then added to the mixure, and the solid amide

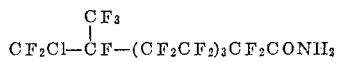

M.P. about 110° C. is obtained.

*Analysis.*—Calculated for $C_{11}H_2F_{20}ClNO$: C, 22.81; H, 0.35. Found: C, 22.34; H, 0.72.

*Example 11.*—Preparation of

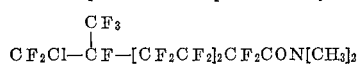

The chlorosulfate

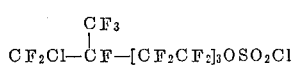

prepared in accordance with Example 2 is slowly added to an excess of dimethylamine at a temperature of 0° C. The reaction mixture is stirred at 0° and then at 25° C. for 0.5 hour. Upon extraction with diethyl ether and separation and drying of the ethereal extract, the ether is distilled off to provide the amide

*Example 12.*—Preparation of

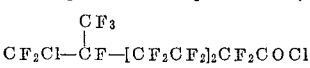

The acid

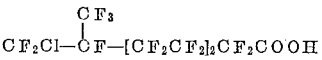

prepared as in Example 2, is converted to its acid chloride by stirring with an excess of phosphorus pentachloride at room temperature, with evolution of hydrogen chloride. After refluxing for several hours, the mixture is distilled to give as a first fraction phosphorus oxychloride and then the acid chloride.

*Example 13.*—Preparation of

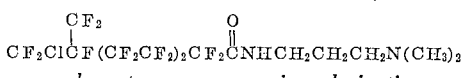

and quaternary ammonium derivative

A solution of 4.33 grams (0.7 mole) of the acid chloride

prepared in accordance with Example 12 in 50 milliliters of diethyl ether is added dropwise to 3.06 grams (0.03 mole) of N,N-dimethyl-1,3-diaminopropane, $$NH_2CH_2CH_2CH_2N(CH_3)_2$$

dissolved in 50 milliliters of diethyl ether. The reaction mixture is stirred at room temperature for several hours. A yellow viscous oil boiling at about 100° C. at about 0.1 mm. Hg is obtained, this being the compound

The above product is dissolved in anhydrous diethyl ether and quaternized by the addition of methyl iodide to form the quaternary ammonium iodide

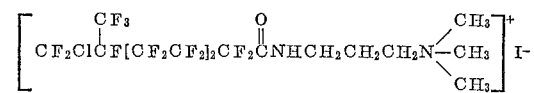

*Example 14.*—Preparation of

An excess of butyl mercaptan is added at room temperature slowly to the chlorosulfate

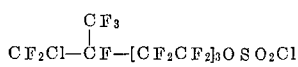

prepared in accordance with Example 2 after which the mixture is refluxed for about one hour. The reaction mixture is then washed with aqueous sodium bicarbonate, dried with anhydrous calcium sulfate, and distilled to provide the thiol ester

having a boiling point of about 125° C. at 10 mm. Hg.

*Example 15.*—Preparation of the acid

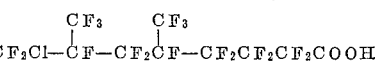

The iodide

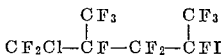

is prepared by the reaction of

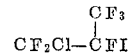

with perfluoropropene in the manner described in copending application Serial No. 701,995, filed December 11, 1957, by Murray Hauptschein et al. A Monel metal autoclave is charged with the iodide

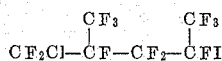

after which tetrafluoroethylene is admitted to the autoclave by gaseous transfer in vacuo providing a molar ratio of tetrafluoroethylene to iodide of 1:1. The autoclave is heated while shaking for twenty hours at a temperature of about 165° C. during which the pressure drops from acid is adjusted so as to maintain the temperature of the mixture at 110° F. After addition of the chromyl chloride solution is completed, the reaction mixture is distilled to remove carbon tetrachloride. The amount of distillate removed in each case is shown in Table I. The mixture is then cooled and water and isopropyl alcohol are added in the amounts shown in Table I to provide in each case a solution containing approximately 30% by weight of solids.

The efficiency of the solutions prepared as described above in imparting water repellancy to cotton fabric is determined as follows:

TABLE I

| Example | Fluoroacid Type | Parts by wt. | Isopropyl Alcohol, Parts by wt. | 34% by wt. Solution of Chromyl Chloride in CCl$_4$ | Distillate Removed, Parts by wt. | Added to Provide Solution Containing 30% Solids, Parts by wt. | |
|---|---|---|---|---|---|---|---|
| | | | | | | Water | Alcohol |
| 16-A | CF$_3$CF(CF$_2$Cl)—(CF$_2$CF$_2$)CF$_2$COOH | 1.19 | 25.5 | 4.12 | 9.5 | 0.13 | 0.80 |
| 16-B | CF$_3$CF(CF$_2$Cl)—(CF$_2$CF$_2$)$_2$CF$_2$COOH | 1.50 | 25.5 | 4.12 | 9.5 | 0.13 | 0.80 |
| 16-C | CF$_3$CF(CF$_2$Cl)—(CF$_2$CF$_2$)$_3$CF$_2$COOH | 0.91 | 12.8 | 2.06 | 4.7 | 0.07 | 0.40 |
| 16-D | CF$_3$(CF$_2$)$_4$COOH | 1.96 | 51.0 | 8.24 | 19.0 | 0.26 | 1.60 |
| 16-E | CF$_3$(CF$_2$)$_6$COOH | 2.59 | 51.0 | 8.24 | 19.0 | 0.26 | 1.60 |
| 16-F | H(CF$_2$CF$_2$)$_3$COOH | 1.09 | 25.5 | 4.12 | 9.5 | 0.13 | 0.80 |
| 16-G | H(CF$_2$CF$_2$)$_4$COOH | 1.40 | 25.5 | 4.12 | 9.5 | 0.13 | 0.80 | an initial pressure of about 1100 lbs./in.$^2$ to about 300 lbs./in.$^2$.

From this reaction there is recovered tetrafluoroethylene telomer iodides of the formula

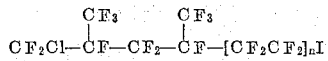

where the value of $n$ ranges from about 1 to about 8. Upon distillation, the telomer iodide

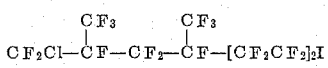

is separated. This iodide is converted to the chlorosulfate by reaction with chlorosulfonic acid in the manner described in Examples 2, 5 and 8. The chlorosulfate is then hydrolyzed with an aqueous 25% sodium hydroxide solution to produce the sodium salt of the acid, which is then acidified with concentrated sulfuric acid to produce the free acid.

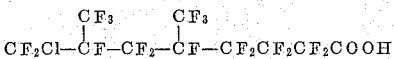

having a boiling temperature of approximately 110° C. at 10 mm. Hg.

*Example 16.—Preparation of Werner type chromium complexes*

Werner type chromium complexes of the acids of Examples 2, 5 and 8 were prepared in the following manner. For the purposes of comparison, Werner type chromium complexes of the perfluoro acids CF$_3$(CF$_2$)$_4$COOH and CF$_3$(CF$_2$)$_6$COOH and of the omega hydroperfluoro acids H(CF$_2$CF$_2$)$_3$COOH and H(CF$_2$CF$_2$)$_4$COOH were prepared in a similar manner. In each case, the acid is dissolved in isopropyl alcohol in the amount shown in Table I. To this solution there is added a 34% by weight solution of chromyl chloride in carbon tetrachloride. The chromyl chloride solution is added in the amounts shown in Table I below the surface of the alcohol solution with stirring. The resulting solution in each case has a ratio of chromium to acid of 2.88 chromium atoms to each molecule of acid. The rate of addition of the chromyl chloride solution to the alcohol solution of the In each case the 30% stock solution is diluted to 1% total solids by adding 3.3 volumes of the 30% solids solution to 50 volumes of distilled water and then adding to this solution 12.2 volumes of a 30% aqueous solution of urea which is added as a buffer and HCl scavenger. The solution is then finally diluted to a total of 100 volumes with distilled water.

Swatches of a 4-ounce cotton white 9" x 9" are padded in the above 1% solution so as to obtain a wet pickup of about 65% or 4 grams on an initial fabric weight of 6 grams, resulting in a final concentration of 0.6% solids on the finished fabric. After weighing, the wet fabrics are cured at 157° C. for 6 minutes. The cured fabrics are then washed thoroughly with distilled water to remove excess urea and dried.

The treated fabrics are tested for water resistance by directing a steady stream of water perpendicular to their surface and by placing water droplets on the surface of the treated fabric and allowing it to stand. When tested in this manner, the fabrics treated with the chromium complexes of the acids of the invention (solutions 16–A, 16–B and 16–C) as well as the chromium complexes of the perfluoro acids (solutions 16–D and 16–E) all show excellent water resistance. The treated fabrics are not wetted by the water stream, demonstrating excellent run off. When water droplets are placed on the surfaces of the treated fabrics they demonstrate no wicking through the cloth even after periods as long as 48 hours.

The fabrics treated with chromium complexes of the omega hydroperfluoro acids, however (solutions 16–F and 16–G), are only effective in repelling gross amounts of water for short intervals and demonstrate little water resistance when water droplets are placed on the fabric surface. The droplets rapidly wet the fabric by wicking action.

In addition to the acyl derivatives discussed above, the acids of the invention may be converted to still other derivatives by known procedures. For example the acids, their acid chlorides, or their alkyl esters, may be converted to alcohols by catalytic reduction or by the use of lithium aluminum hydride following the procedures described, for example, in J.A.C.S., vol. 75, p. 2693

(1953), Filler et al., to produce alcohols, e.g. of the formula

When the acid is reduced using lithium aluminum hydride, aldehydes may be also obtained, e.g. of the formula

Ketones may also be produced by reacting the acid or the lithium salt with a Grignard reagent or an alkyl lithium to produce ketones, e.g. of the formula

where R is a hydrocarbon group, as described, e.g. by Sykes et al., Chemistry & Industry, p. 630 (1955) or by Rausch et al., Journal of Organic Chemistry, vol. 21, p. 1328 (1956). Symmetrical fluorinated ketones may be produced by the reaction of alkyl esters of the acids of the invention with metallic sodium in ether in accordance with Hauptschein et al., J.A.C.S., vol. 77, p. 4930 (1955).

The terminally branched, terminally monochlorinated acids of the invention and their derivatives have many useful applications in areas where the advantage may be taken of the extremely low surface energy properties of the fluorinated portion of the molecule.

Thus, the acids themselves, or derivatives containing a water solubilizing group, such as alkali metal salts, amine salts, ammonium salts, etc. are useful as specialty surfactants in aqueous media, particularly where a system of extremely low surface tension is required or where a surfactant of a high degree of chemical stability is needed. For example, the acids of the invention, particularly in the form of their ammonium salts, are useful as surfactants in the emulsion polymerization of ethylenically unsaturated monomers, particularly halogenated monomers, such as tetrafluoroethylene and vinylidene fluoride. The use of perfluorinated carboxylic acids and derivatives for this purpose is described, e.g. in U.S. Patent 2,559,752. The acids of the invention and corresponding derivatives may be employed in a similar manner. As surfactants in aqueous systems, the acids of the invention and/or their derivatives are especially useful because of the remarkably low surface tension which they impart in relatively low concentrations. In FIGURE 1 of the drawing it is apparent that the terminally monochlorinated compound of the invention is even superior in surface tension lowering properties to an equivalent chain length perfluoro acid when the surfactant concentration is lower than about one percent.

Another use for the acids of the invention and their derivatives is in the modification of surfaces to impart a high degree of water repellency and good oil repellency. Thus, when fabrics, paper, or other cellulosic material, leather, glass, metal, etc. are surface treated with the acids of the invention or suitable derivatives, the treated surfaces are rendered both hydrophobic and oleophobic to a marked degree. Suitably treated fabrics, for example, will resist both water and oil borne stains since the treated fabric will tend to resist wetting both by aqueous and oleaginous systems.

In order to suitably fix the long chain fluorinated group on the substrate, it is desirable to convert the acid into derivatives which are suitable for such application. For example, when the carboxylic acids of the invention are converted to chromium complexes of the Werner type, the complexes so produced are highly useful for the treatment of paper and other cellulosic material or in the treatment of leather for imparting a high degree of water and soil resistance thereto. Conversion of the acids of the invention into suitable chromium complexes may be readily accomplished according to the methods described in U.S. Patents 2,662,835 and 2,693,458, which describe the preparation of such chromium complexes from fully fluorinated carboxylic acids.

For the same purpose, the acids of the invention may also be converted to aluminum complex salts of the Werner type according to the methods described in U.S. Patent 2,823,144 which describes the preparation of such aluminum complexes from fully fluorinated carboxylic acids. The aluminum complexes, like the chromium complexes, have the property of adhering tenaciously to substrate surfaces such as textile fibers, paper, wood and other cellulosic material, metals, ceramics, etc., and provide a treated surface which is highly hydrophobic and also oleophobic to a marked degree.

Other useful derivatives of the acids of the invention through which the fluorinated portion of the molecule may be attached to a substrate surface are those containing olefinic unsaturation through which the derivative may be converted to a polymeric material. Thus, for example, the acids of the invention may be converted to vinyl esters by reaction with acetylene as described in U.S. Patent 2,592,069, or by transesterification, for example with vinyl acetate. The vinyl esters thus produced may be homopolymerized or copolymerized with other ethylenically unsaturated monomers to provide valuable polymers and copolymers. These are particularly useful in the form of latices for the impregnation of textile fibers in the form of yarn, fabrics, etc. or other fibrous materials for imparting oil and water resistance thereto, and thus a marked degree of resistance to both oil and water borne stains and soils.

Instead of vinyl esters, the acids of the invention may also be converted to polymerizable vinyl ethers or polymerizable acrylates or methacrylates. This may be accomplished, for example, by first converting the acid to an alcohol, e.g. by reduction, according to procedures described, for example in U.S. Patents 2,666,797 and 2,862,977 where the reduction of fully fluorinated carboxylic acids to corresponding 1,1-dihydroalcohols is described. The alcohols thus obtained may be converted to vinyl ethers following, for example, the procedures of U.S. Patent 2,732,370, or converted to esters of acrylic or methacrylic acid following the procedures of U.S. Patent 2,642,416, which describe the conversion of fully fluorinated perfluoroalcohols into such derivatives. The vinyl esters or acrylates thus produced may be polymerized into useful polymers having unique surface properties. Such polymers have uses similar to those of the vinyl esters described above.

Another useful class of derivatives of the acids of the invention are the quaternary ammonium compounds, particularly in the form of their halides and sulfate salts. Such derivatives may be prepared according to the procedures described in U.S. Patents 2,727,923 and 2,764,602 which describe the preparation of such derivatives of fully fluorinated carboxylic acids. Such quaternary ammonium derivatives are strongly absorbed on substrate surfaces and are useful in the treatment of textiles, paper and other cellulosic materials to provide oleophobic and hydrophobic properties. They have particular utility as additives for oils and waxes, enhancing the properties of such materials by the greatly reduced surface tension which they impart. Such derivatives are particularly useful, for example as ingredients of water emulsion type liquid polishes which dry to a bright finish without buffing. See, for example, U.S. Patent 2,937,098 where the use of fully fluorinated acids and their quaternary ammonium salt derivatives as additives to such compositions is described. Amazing leveling effects are obtained. The acids of the invention and their quaternary ammonium derivatives are similarly useful for such applications.

Other uses for the acids of the invention and their derivatives which take advantage of the extremely low surface energy properties of the fluorinated portion of the molecule include, for example, their use as additives to hydrocarbon fuels and lubricating oils. Thus, the acids of the invention and their derivatives may be used in the same manner as fully fluorinated acids and derivatives as described in U.S. Patents 2,680,717; 2,715,107 and 2,876,750. Similarly, the acids of the invention and their derivatives will find utility in the extraction of petroleum from underground deposits. By modification of the surfaces of the underground formation, rendering them both oleophobic and hydrophobic, the flow resistance of the petroleum through the formation is decreased and recovery of the petroleum thereby facilitated. Applications of this type using fully fluorinated carboxylic acids are described in U.S. Patents 2,765,851; 2,792,894; 2,812,817 and 2,866,507.

Still another use for the acids of the invention is as intermediates for conversion into peroxides. These are useful as polymerization catalysts, particularly for halogen substituted ethylenically unsaturated monomers. The preparation of such peroxides may be accomplished according to the methods described in U.S. Patent 2,792,423 which describes the preparation of peroxides from fully fluorinated carboxylic acids.

We claim:
1. Compounds selected from the class consisting of terminally branched chain, terminally monochlorinated, but otherwise perfluorinated carboxylic acids having a chain length of at least 6 carbon atoms and having the formula:

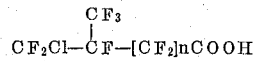

where $n$ is an integer ranging from 3 to 9 inclusive, and the metal salts, ammonium salts, and acyl halides of said acids.

2. Compounds in accordance with claim 1 wherein the value of $n$ is 5.

3. Compounds in accordance with claim 1 wherein the value of $n$ is 7.

References Cited by the Examiner
UNITED STATES PATENTS

| | | | |
|---|---|---|---|
| 2,790,815 | 4/1957 | Brice et al. | 260—408 |
| 2,992,226 | 7/1961 | Chambers et al. | 260—539 |

CHARLES B. PARKER, *Primary Examiner.*

DANIEL D. HORWITZ, *Examiner.*